Dec. 23, 1941.    A. VIDA    2,266,926
CERAMIC MARBLE
Filed Sept. 19, 1939    2 Sheets-Sheet 1

INVENTOR
ALEX VIDA
BY Munn, Anderson + Liddy
ATTORNEY

INVENTOR
ALEX VIDA
BY Munn, Anderson & Liddy
ATTORNEY

Patented Dec. 23, 1941

2,266,926

UNITED STATES PATENT OFFICE 2,266,926

CERAMIC MARBLE

Alex Vida, San Francisco, Calif.

Application September 19, 1939, Serial No. 295,603

13 Claims. (Cl. 41—26)

My invention relates to improvements in a ceramic marble, and it consists of the combinations, constructions and arrangements hereinafter described and claimed.

An object of my invention is to provide a process which will permit various colored ceramics to be applied to a glass to form a desired design, after which the ceramics may be fused into the glass and form a permanent part thereof. It is possible to obtain veining effects and coloring which will simulate actual marble and the fusing of the ceramic coloring into the glass will permit the glass to supplant marble in interior or exterior finishing and in fact any place where decorative surface finishing is desired. The glass can also be used for other purposes and the fused ceramics will not deteriorate through use.

This invention is an improvement over the M. L. MacDonald and Alex Vida patent, No. 2,040,863, issued May 19, 1936. In the patent, paint is applied to the rear glass surface to form the desired design and the painted surface is protected by a cloth backing. It was found that in time the paint deteriorated due to the fact that the cloth backing did not afford sufficient protection and this caused the design to become marred. I have overcome this defect in the patent by using colored ceramics in the present invention instead of paint and fusing the completed colored design into the glass. This causes the design to become an integral part of the glass and does away with the necessity of providing any backing. The design will last as long as the glass.

Another advantage of the present process is the translucency of the completed article. The cloth backing in the patented device makes the glass opaque. In the present case, translucent colors may be used in the ceramics and the fusing of the colors to the glass obviates the necessity of a cloth backing for protective purposes and the glass is translucent enough to be illuminated by a light. Even though an opaque coloring is used in parts of the design, the other parts will remain translucent.

Other objects and advantages will appear in the following specification, and the novel features of the device will be particularly pointed out in the appended claims.

My invention is illustrated in the accompanying drawings forming a part of this application, in which Figure 1 is a plan view of the completed product where veining is accomplished without using raw silk strands;

In carrying out my invention, I make use of two liquids that will not mix, such as water and turpentine and use these as vehicles for carrying colored powdered glass in order to apply the powdered glass in a thin layer over the piece of glass on which a design is to be fused. For example, a quantity of glass enamel of the desired color, may be purchased and mixed with water so that the resulting mixture will be of a thin consistency. I have found that five parts of powdered colored glass mixed with ten parts of water will give the best result. I provide a second mixture of a colored powdered glass mixed with turpentine in the proportion of five parts of colored glass to ten parts of turpentine. Any desired color may be used and a number of different colored mixtures can be prepared, some with water and others with turpentine.

Figure 1:
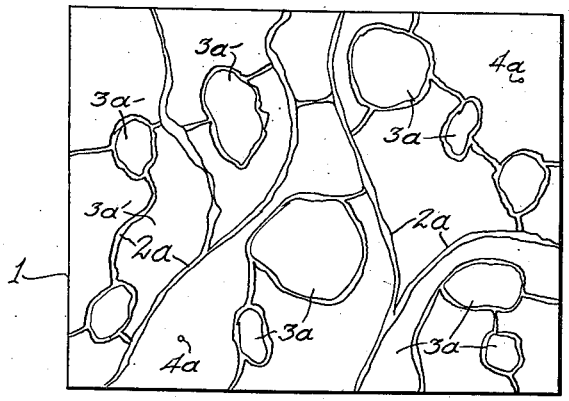
Figure 2:
Figures 2, 3, 4 and 5 are transverse sections diagrammatically illustrating the various steps performed in the manufacture of the product.

In Figure 2, I show a transverse section through a pane of glass 1, and I indicate a layer of color 2, composed of water and colored glass, covering the rear surface of the glass. This layer may be composed of more than one color because portions of the glass may be painted with one color and other portions may be painted with another or additional colors. The layer of colored glass and water should be made as thin as possible.

Figure 3:
Figure 4:
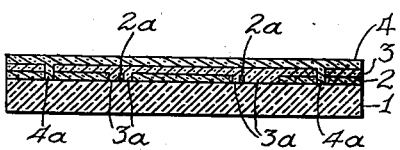

Immediately after applying the thin coating of colored powdered glass mixed with water, a second contrasting color 3 of glass mixed with turpentine, see Figure 3, is splashed or daubed onto the glass. One or more contrasting colors may be applied in this manner. The spirits of turpentine may have a little fat oil added to it if necessary. Should it be desired to give the turpentine more binding properties, dammar varnish may be added.

The splashing or daubing of the turpentine mixed with colored powdered glass onto the first layer of color 2 will cause the turpentine to penetrate through the first layer at certain places. The reason for this is that turpentine repels water rather than mixes with it. The turpentine color moves the water color into veining effects shown at 2a in Figures 1, 3, 4 and 5. The layer of turpentine is shown at 3 and where the turpentine has broken through the water layer, I have indicated such broken-through portions at 3a. I do not wish to be confined to only water and turpentine as carriers for the powdered glass. Any two mediums may be used so long as the mediums will not mix together. Water and gasoline could be used for example.

Different quantities of turpentine may be mixed with different colors of powdered glass and these various colors may be daubed or splashed onto the first layer of color to break through this layer and create a design with a number of colors. The veins 2a will have the color of the first layer and the areas 3a adjacent to the veins will have the color of the second layer. The drawing does not illustrate the use of additional colors.

The glass with the desired design painted thereon is now allowed to dry for about six hours at atmospheric temperature. It is possible to hasten the drying by using heat. Any small holes appearing in the coloring after the drying period, can be filled with additional colored glass mixed with turpentine. This third layer is preferably sprayed onto the glass as shown at 4 in Figure 4. An opening extending through two layers of the dried coloring is shown filled with the same color that makes up the layer 4. The filled opening is indicated at 4a.

The glass is again allowed to dry and then is fired to cause the colored glass to be fused onto and become a permanent part of the pane of glass. The firing is done at a temperature between 900° to 1300° F., depending upon the type of ceramics used. When the enamel is thoroughly fused to the glass, the glass is removed and the product is now complete. It is still possible to apply another coat of ceramic mixture and fire the glass again if desired.

Figure 5:
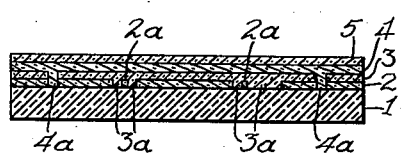

Should it be necessary to make the glass opaque, a layer of opaque coloring may be applied as shown at 5 in Figure 5. This may be done before or after firing the product and therefore the subsequent firing of the glass will fuse the layer of opaque material to the glass as well as the other layers. The opaque layer is also preferably made of an opaque colored powdered glass mixed with turpentine or water.

The lines of veining can be more distinctly brought out in the completed product if raw silk fibres or other fibrous material or flexible strands are used during the application of the different colors to the rear face of the glass. In Figures 6 to 10 inclusive, I show such a process. The use of flexible strands for the purpose of veining is my preferred process because it makes the design closely simulate a piece of marble.

Figure 7:
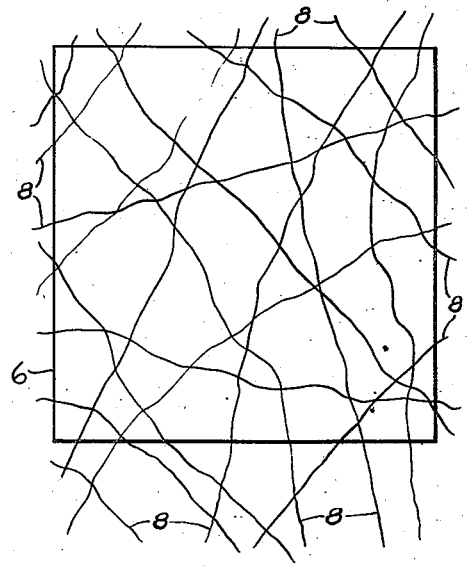
Figure 7 is a plan view of the rear face of the glass, showing the step of veining with raw silk.

The rear face of a plate of glass 6 is covered with a layer 7 of one or more different colors similar to the colored layer 2. The color of the layer 7 is formed from powdered glass having the desired color, mixed with water in the proportions of five parts of powdered glass to ten parts of water. A silk net 8, made from raw silk fibres, see Figure 7, is now laid upon the colored layer 7 before it dries. The silk can be dry when applied to the wet surface and I have found that when the dry silk threads are pressed into the colored layer 7 and contact with the rear face of the glass 6, they will form narrow irregular grooves which will closely simulate the fine veining in actual marble. The wet color is drawn to the dry silk by capillary attraction and in this way the color is moved into and alongside of the silk strands. Veinings of different colors may be formed by applying the different colors to the glass near the strands whereupon the colors will be attracted to the strands by capillary attraction. Should it be desired to make heavier veining in the completed product, the silk threads may be moistened by dipping them in water. It is possible to dip the threads into a contrasting color formed of water and colored powdered glass and then apply them to the glass before the colored layer 7 is added. It is also possible to moisten the strands with water alone and lay them on the glass. The raw silk when opened up will cause its strands to break into a marble-like pattern.

Figure 8:
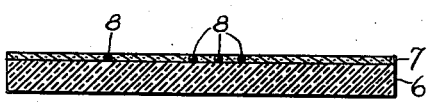
Figures 8 to 12 inclusive, are transverse sections diagrammatically illustrating the various steps performed in the manufacture of the product.

Figure 8 shows the silk strands 8 embedded in the colored layer 7 and contacting with the rear face of the glass 6. The silk strands may be forced into the colored layer 7 and against the glass 6 by daubing them with a wet rag. The colored layer 7 and the silk strands are now covered with a second colored layer 9, see Figure 9. The layer 9 is formed of powdered colored glass mixed with turpentine in the proportion of five parts of powdered glass to ten parts of turpentine. The layer 9 in this respect is similar to the layer 3. The turpentine color is thinly applied over the layer 7 in order to avoid the formation of pin holes. The thickness of the second colored layer may be more readily controlled by spraying the material over the first layer. The splashing or daubing of one or more turpentine colors over the layer 7 are other ways of carrying out this step in the process.

Figure 9:
Figure 10:
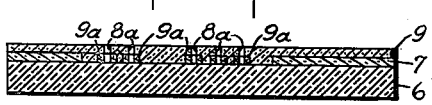

The turpentine will break through the first layer or coat and will force the water color layer against the silk strands 8 as shown at 9a in Figure 9. This will make the final veining of one or more colors depending upon the coloring or non-coloring of the silk strands. A distinct shading or merging of one color into a contrasting color is possible if the silk strands are removed before the two colored layers are dry. A more distinct line will separate different contrasting colors if the colors are permitted to dry before the silk strands are removed. Of course, some of the color will be picked up by the strands when they are removed. Figure 10 illustrates the channels or grooves 8a formed in the colored layers by the removal of the silk strands. The channels extend down to the rear face of the glass 6.

Figure 11:
Figure 12:
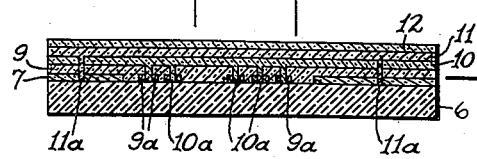

A final coat 10 of color is now added, see Figure 11, and will fill the channels or grooves 8a at 10a. The colored veining resulting is indicated by the lines 10a in Figure 6. The colored lines are bordered by contrasting colored areas shown at 9a. The colors are now allowed to dry after which the glass is fired at the temperature already stated, in order to fuse the colored powdered glass thereinto. The steps of drying and firing are the same as that described for the glass 1. Should pin holes develop in the drying step, another coat of color 11 can be applied and this will fill the pin holes as indicated at 11a in Figures 6 and 12. It is also possible to apply an opaque color coat as at 12, if desired.

Figure 6:
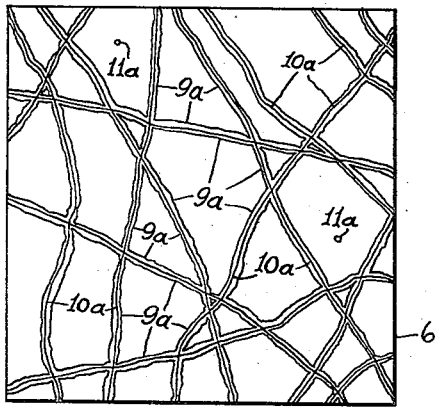
Figure 6 is a plan view of the completed product when the veining is accomplished with raw silk strands.

The completed product will closely resemble a piece of marble as indicated in Figure 6. The designs may be varied continually because the raw silk never opens up in the same pattern.

Any desired glass colors can also be used. The water or turpentine merely acts as a carrying medium for the powdered glass. When the powdered glass is fused into the pane of glass, it becomes a permanent part thereof. No protecting coat of cloth for the colored side of the glass is necessary as is true in the patent already mentioned. The product can be used for a great number of different purposes and will withstand climatic changes indefinitely without deteriorating. The veining can be large or small and of different colors. The background can provide a mottled effect of various colors. This is accomplished by using two carrier liquids that will not mix such as water and turpentine.

It is possible to form a simple ceramic marble pattern by applying the raw silk strands to the glass, covering the glass with a coating of powdered colored glass mixed with a liquid vehicle and allowing the coating to dry. The silk strands can then be removed and a contrasting color, made up of powdered colored glass and a liquid vehicle, applied to fill up the fractures in the first coat made by the strands. This second coat is allowed to dry after which the ceramic colors may be fused into the glass and become a permanent part thereof. The resulting design will have a background of one color and veining of a contrasting color.

While I have shown only two forms of my invention, it should be understood that various changes or modifications may be made within the scope of the appended claims without departing from the spirit of the invention.

I claim:

1. The method of producing ceramic marble by means of a glass plate which comprises the steps of applying strands upon the face of the plate, applying a coat of ceramic color to the plate, the coat being composed of a mixture of powdered colored glass and a liquid vehicle, splashing a second ceramic color onto different portions of the first color before the first color dries, the second color being composed of a contrasting powdered colored glass and a liquid vehicle that will penetrate the first colored coat and force the first liquid toward the strands, allowing the colors to dry, removing the strands through the colored layers whereby channels are formed, applying a third coat of powdered colored glass mixed with a liquid vehicle, permitting the third coat to dry, and fusing the powdered colored glass onto the glass plate for causing it to become a permanent part thereof.

2. The herein described method of manufacturing ceramic marble comprising, disposing in patterns and applying water-moistened hair-like material to one side of a glass plate, covering said side of the plate and the hair-like material with a mixture of a powdered colored glass and a liquid vehicle by splashing the mixture onto the glass, the liquid being of a material that will evaporate and leave no residue which would alter the color of the powdered glass when fused, allowing the liquid vehicle to partially evaporate, separating the hair-like material from the plate to provide fractures in the colored material in precise agreement with the aforementioned patterns, then splashing or spraying a second coat of a different colored glass over the first coat to provide a composite in simulation of a thin slab of polished marble wherein one ceramic color provides the groundwork and a different ceramic color provides the veining running through the groundwork when viewed from the opposite side of the plate, and applying heat sufficient to fuse the ceramic colors onto the glass.

3. The herein described method of manufacturing ceramic marble which consists in applying a coat of one or more colors to a glass plate, the coat being composed of colored powdered glass mixed in a liquid vehicle, splashing a second contrasting color onto different portions of the first coat, the second color being composed of powdered colored glass mixed in a liquid vehicle that will penetrate the first liquid and not mix therewith, whereby the second color will contact with the glass surface and will cause the first color to fill the spaces not occupied by the second color, allowing the colors to dry, and in heating the glass and dried colors to a temperature where the colored powdered glass will fuse onto the glass plate.

4. The herein described method of manufacturing ceramic marble which consists in applying a coat of one or more colors to a glass plate, the coat being composed of colored powdered glass mixed in a liquid vehicle, splashing a second contrasting color onto different portions of the first coat, the second color being composed of powdered colored glass mixed in a liquid vehicle that will penetrate the first liquid and not mix therewith, whereby the second color will contact with the glass surface and will cause the first color to fill the spaces not occupied by the second color, allowing the colors to dry, filling any pin holes developed during the drying of the colors, with an additional colored powdered glass and a liquid vehicle, allowing the last color to dry, and in fusing the colors onto the glass.

5. The herein described method of manufacturing translucent ceramic marble which consists in mixing translucent colored powdered glass with a liquid vehicle and applying it to one face of a glass plate, splashing a second contrasting color onto different portions of the first coat, this being composed of a translucent colored powdered glass mixed with a liquid vehicle that will penetrate the first liquid and concentrate it into vein-like patterns, allowing the colors to dry, and in fusing the powdered glass onto the glass plate.

6. The herein described method of manufacturing ceramic marble which consists in mixing colored powdered glass with water, dipping raw silk into the liquid to saturate it, removing the silk and spreading it into a marble-like veining pattern, placing the opened silk onto a glass plate, mixing a contrasting colored powdered glass with water, coating the glass plate with the second color, mixing a third contrasting colored powdered glass with turpentine, splashing the third color onto different parts of the second color, the third color penetrating the second and driving it to the silk strands, allowing the colors to dry, removing the silk strands, filling any voids with another mixture of colored powdered glass and turpentine, allowing this last mixture to dry, and in heating the glass plate to a temperature to fuse the powdered glass thereonto.

7. The herein described method of manufacturing opaque ceramic marble which consists in mixing colored powdered glass with water and applying a coat to a plate glass, mixing another colored powdered glass with turpentine and splashing it onto the first coat at various places, the turpentine penetrating the water and causing it to form veins therein, allowing the colors to dry, mixing an opaque colored powdered glass with turpentine and applying it to the other two colors, allowing the last color to dry, and then in fusing the powdered glass colors to the glass plate by heating the plate to the required temperature.

8. The herein described method of manufacturing opaque ceramic marble which consists in mixing colored powdered glass with water, dipping raw silk into the mixture, opening the raw silk to form a marble veining pattern, applying the opened silk to a glass plate, mixing a contrasting color of powdered glass and water and applying it to the plate, mixing a third contrasting color of powdered glass and turpentine and splashing this onto various parts of the first coat, allowing the colors to dry, removing the silk strands, mixing opaque colored glass with turpentine and covering the dried colors, allowing this last coat to dry, and in heating the glass plate to a temperature to fuse the powdered glass onto the plate.

9. The method of producing ceramic marble with narrow veining by means of a glass plate which comprises the steps of applying strands upon the face of the plate, applying a coat of ceramic color to the plate, the coat being composed of a mixture of powdered colored glass and a liquid vehicle, allowing the coat to dry, removing the strands whereby channels are formed in the coat, applying a second coat of powdered colored glass mixed with a liquid vehicle over the first coat to fill the channels, permitting the second coat to dry, and fusing the powdered colored glass onto the glass plate for causing it to become a permanent part thereof.

10. The method of producing ceramic marble with wider veining by means of a glass plate which comprises the steps of applying wet strands upon the face of the plate, applying a coat of ceramic color to the plate, the coat being composed of a mixture of powdered colored glass and a liquid vehicle, allowing the coat to dry, removing the strands whereby channels are formed in the coat, applying a second coat of powdered colored glass mixed with a liquid vehicle over the first coat to fill the channels, permitting the second coat to dry, and fusing the powdered colored glass onto the glass plate for causing it to become a permanent part thereof.

11. The method of producing ceramic marble with veining of a plurality of colors by means of a glass plate which comprises the steps of dipping strands into a mixture of colored powdered glass and a liquid, applying the wet strands upon the face of the plate in the form of a pattern, applying a coat of ceramic color to the plate, the coat being composed of a mixture of powdered colored glass and a liquid vehicle, allowing the coat to dry, removing the strands whereby channels are formed in the coat that are partially filled with the colored glass carried by the strands, applying a second coat of powdered colored glass mixed with a liquid vehicle over the first coat to completely fill the channels, permitting the second coat to dry, and fusing the powdered colored glass onto the glass plate for causing it to become a permanent part thereof.

12. The method of producing ceramic marble with wider veining by means of a glass plate which comprises the step of applying wet strands upon the face of the plate, applying a coat of ceramic color to the plate, the coat being composed of a mixture of powdered colored glass and a liquid vehicle, splashing a second ceramic color onto different portions of the first color before the first color dries, the second color being composed of a contrasting powdered colored glass and a liquid vehicle that will penetrate the first colored coat and force the first liquid toward the strands, allowing the colors to dry, removing the strands through the colored layers whereby channels are formed in the two coats, applying a third coat of powdered colored glass mixed with a liquid vehicle to fill the channels, permitting the third coat to dry, and fusing the powdered colored glass onto the glass plate for causing it to become a permanent part thereof.

13. The method of producing ceramic marble by means of a glass plate which comprises the steps of applying strands upon the face of the plate, applying a coat of ceramic color to the plate, the coat being composed of a mixture of powdered colored glass and a liquid vehicle, allowing the coat to partially dry and then removing the strands whereby channels are formed in the coat, applying a second coat of powdered colored glass mixed with a liquid vehicle over the first coat to fill the channels, the partially dried color of the first coat adjacent to the channels blending with the portion of the color of the second coat received in the channels to form colored veins whose edges blend into the color of the first coat, permitting the second coat to dry, and fusing the powdered colored glass onto the glass plate for causing it to become a permanent part thereof.

ALEX VIDA.